(12) United States Patent
Leung et al.

(10) Patent No.: US 11,232,390 B1
(45) Date of Patent: Jan. 25, 2022

(54) ITEM TRACKING SYSTEM WITH ELECTRONIC TRACKING LABELS CONTAINING SENSORS

(71) Applicant: Ferret Systems Inc., La Jolla, CA (US)

(72) Inventors: Gary Leung, San Jose, CA (US); Venu Gutlapalli, San Diego, CA (US); Joseph Reddy, San Diego, CA (US)

(73) Assignee: Ferret Systems Inc., La Jolla, CA (US)

( * ) Notice: Subject to any disclaimer, the term of this patent is extended or adjusted under 35 U.S.C. 154(b) by 0 days.

(21) Appl. No.: 17/362,840

(22) Filed: Jun. 29, 2021

(51) Int. Cl.
| | |
|---|---|
| *G08B 5/22* | (2006.01) |
| *G06Q 10/08* | (2012.01) |
| *G06K 19/02* | (2006.01) |
| *G06K 19/077* | (2006.01) |
| *H04W 4/80* | (2018.01) |
| *G06K 19/07* | (2006.01) |
| *H04W 4/029* | (2018.01) |

(52) U.S. Cl.
CPC ....... *G06Q 10/0833* (2013.01); *G06K 19/025* (2013.01); *G06K 19/0707* (2013.01); *G06K 19/0717* (2013.01); *G06K 19/0723* (2013.01); *G06K 19/0776* (2013.01); *G06K 19/07707* (2013.01); *G06K 19/07722* (2013.01); *H04W 4/029* (2018.02); *H04W 4/80* (2018.02)

(58) Field of Classification Search
CPC . G06Q 10/0833; H04W 4/029; G06K 19/025; G06K 19/0707
USPC .......................................................... 340/8.1
See application file for complete search history.

(56) References Cited

U.S. PATENT DOCUMENTS

| | | | |
|---|---|---|---|
| 2005/0134461 A1* | 6/2005 | Gelbman | G06K 17/00 340/572.8 |
| 2018/0247257 A1* | 8/2018 | Lert, Jr | B65G 1/1373 |
| 2020/0151655 A1* | 5/2020 | Khoche | G06Q 10/0833 |
| 2020/0320465 A1* | 10/2020 | Yang | G06Q 10/0833 |
| 2021/0216958 A1* | 7/2021 | Pacheco | H04L 63/00 |

\* cited by examiner

*Primary Examiner* — Ahshik Kim
(74) *Attorney, Agent, or Firm* — Arc IP Law, PC; Joseph J. Mayo

(57) ABSTRACT

A tracking and monitoring system that uses "smart" tracking labels with printed label information on the top and electronics and sensors embedded in thin, flexible layers underneath. Labels may be used to track the location of items, and to monitor item parameters such as temperature, shock, weight, or tampering. Tracking labels may have communications interfaces to transmit label location and sensor data to a centralized server for monitoring and analysis; interfaces may include for example Bluetooth, Wi-Fi, cellular, or Amazon Sidewalk. Label location may be determined from an integrated GPS, by triangulation using received signals from cellular or other networks, or from the location of nearby connected devices. Labels may be battery powered and may use energy harvesting to obtain power from the environment. To conserve battery life, manufactured labels may be put into a hibernation state, and activated when they are placed on an item.

20 Claims, 9 Drawing Sheets

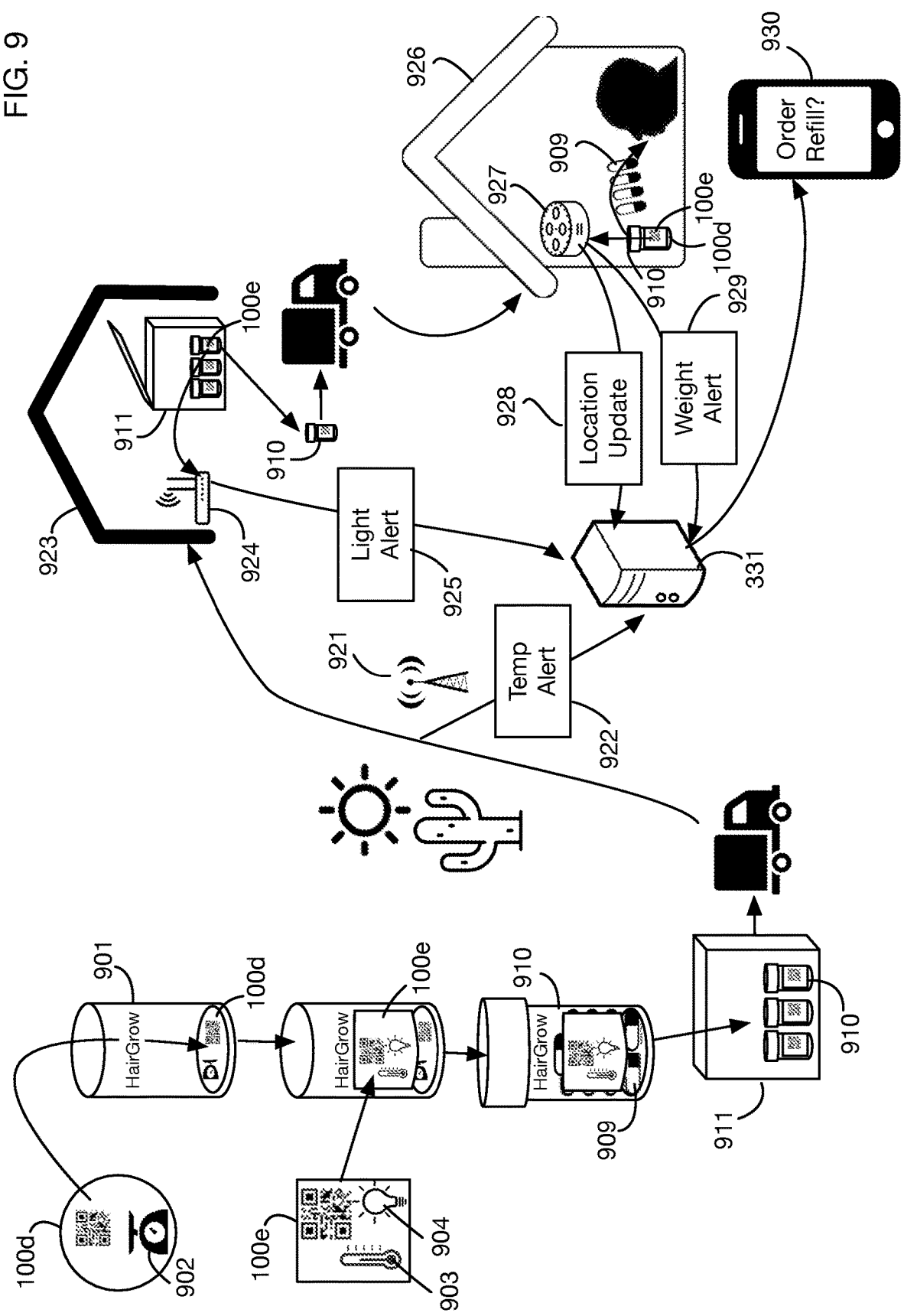

ITEM TRACKING SYSTEM WITH ELECTRONIC TRACKING LABELS CONTAINING SENSORS

BACKGROUND OF THE INVENTION

Field of the Invention

One or more embodiments of the invention are related to the fields of electronic tracking devices and information systems. More particularly, but not by way of limitation, one or more embodiments of the invention enable an item tracking system with electronic tracking labels containing sensors.

Description of the Related Art

Electronic tags for identifying and tracking items are widely used for supply chain management. Examples include RFID tags, and Bluetooth-enabled tags. These devices provide limited functionality. RFID tags for example provide a small amount of memory that can be read (or written) with a compatible reader; this functionality is useful to identify an item and to retrieve simple information. Bluetooth tags with some additional features are becoming available; for example some of these tags include certain sensors. Both RFID and Bluetooth tags require that compatible readers be located very close to the tags. These tags also can only "locate" an item by alerting when a tag is within or out of range of a compatible reader.

There are no known tracking systems that provide electronic tracking labels with a wide range of sensors in a single label, with multiple communications interfaces including short-range options like Bluetooth and long-range options such as cellular networks, and with integrated location tracking.

For at least the limitations described above there is a need for an item tracking system with electronic tracking labels containing sensors.

BRIEF SUMMARY OF THE INVENTION

One or more embodiments described in the specification are related to an item tracking system with electronic tracking labels containing sensors. Embodiments of the invention may be applied for example to supply chains to track items from the factory to the consumer, and to monitor the condition of items using sensors integrated into the tracking labels.

In one or more embodiments of the invention, the item tracking system may have multiple tracking labels, each with a label that may be applied to an item, a database of tracking histories for the tracking labels, and a server coupled to the database. The server may receive tracking label update messages that each contain a unique identifier of the tracking label, a time, a location of the tracking label at that time, and one or more sensor values captured by one or more sensors in the tracking label; it may add the contents of the update message to the database. Each tracking label may contain a label (which may show for example printed text or symbols), and a flexible electronic circuit attached to or integrated into the label. The circuit may include a controller, a power source, a wireless communications interface, one or more sensors, and a unique identifier. It may also include an activation mechanism that modifies an activation input when a user or an activation device performs an activation action. The flexible electronic circuit may switch from a hibernation state to an active state when this activation mechanism modifies the activation input.

In one or more embodiments, each tracking label may have multiple layers, including a liner layer, an adhesive layer above the liner layer, a label bottom layer above the adhesive layer, a conductive traces layer above the label bottom layer, an electronic components layer above the conductive traces layer, and a label top layer above the electronic components layer. In one or more embodiments the maximum thickness of a tracking label may be less than or equal to 1.5 millimeters.

In one or more embodiments, the activation mechanism may include an electrical path coupling the power source to the activation input, and the activation action may break this electrical path, changing the activation input. For example, the tracking label may have a portion that the electrical path passes through, and removal of this portion of the tracking label may break the electrical path. This portion to be removed may be for example a tab that is torn off or cut off to activate the label, or a conductive sheet that is peeled off to activate the label. In one or more embodiments the activation mechanism may have an electrical path coupling a near-field communication receiver to the activation input, and the activation action may include transmission of electromagnetic energy to this receiver.

In one or more embodiments, the power source may include one or both of a battery and an energy harvesting circuit that receives power from the tracking label environment.

In one or more embodiments, the sensor(s) of the tracking label may include one or more of: a temperature sensor, a humidity sensor, a light sensor, a motion sensor; a pressure sensor, a shock sensor, a sensor that measures peeling or bending, and a sensor that detects opening of a container or breaking of a seal.

In one or more embodiments, the flexible electronic circuit of a tracking label may include one or more indicators. Indicators may be for example LEDs or displays.

In one or more embodiments, the wireless communications interface of a tracking label may include one or more of: a Bluetooth interface, a Wi-Fi interface, a cellular network interface, and a sub-Gigahertz wireless interface.

One or more embodiments with a cellular network interface may determine the location of the tracking label via triangulation via the cellular network.

In one or more embodiments, the flexible electronic circuit of a tracking label may have a GPS receiver, and the controller of the tracking label may obtain the label's location from the GPS receiver. If the tracking label also has a cellular network interface, then triangulation using the cellular network may be used to determine the location if the GPS receiver does not provide the location.

In one or more embodiments, the wireless communications interface of the tracking label may connect to a local device in the vicinity of the tracking label. The local device may be coupled to the server via a network connection. The local device may transmit the tracking label update message to the server. The location of the local device may be used as the location in the update message.

In one or more embodiments, the server may transmit a settings update message to one or more tracking labels. This message may include one or more sensor data collection rules. The rules may for example include one or more of an interval at which a sensor should collect data, and a range of sensor data values that trigger an alert.

BRIEF DESCRIPTION OF THE DRAWINGS

The above and other aspects, features and advantages of the invention will be more apparent from the following more particular description thereof, presented in conjunction with the following drawings wherein:

FIG. 9 shows an illustrative application of an item tracking system in a pharmaceutical supply chain.

DETAILED DESCRIPTION OF THE INVENTION

An item tracking system with electronic tracking labels containing sensors will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
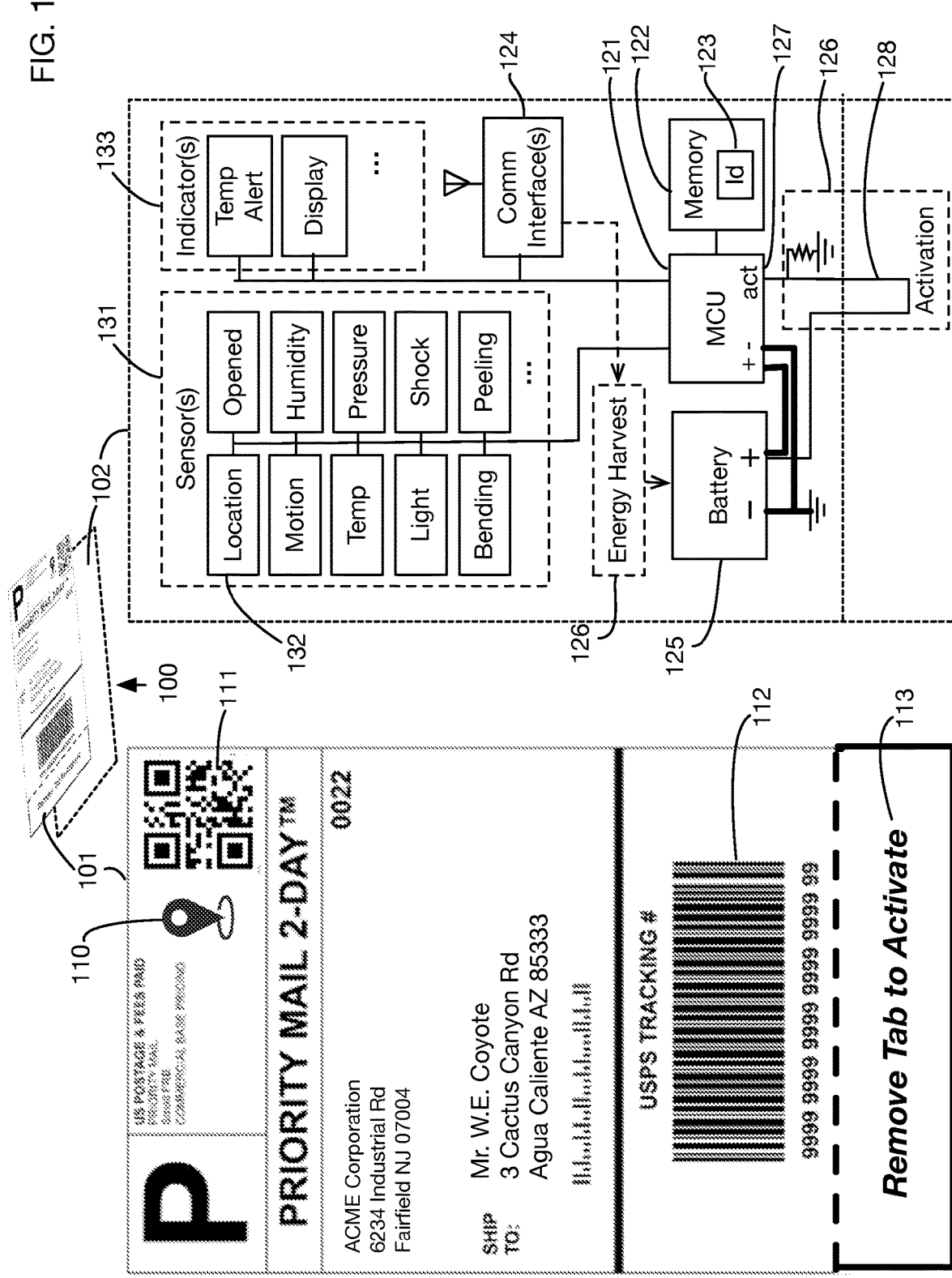
FIG. 1 shows an illustrative tracking label that contains electronic components such as a microcontroller, a communication interface, and one or more sensors.

One or more embodiments of the invention enable tracking of items by combining "smart" electronic tracking labels with a centralized system that collects and analyzes data from these smart labels. FIG. 1 shows an illustrative embodiment of a tracking label 100, which has a top layer 101 that resembles a typical printed layer, and one or more layers 102 below this top layer that contain flexible electronic circuits. Illustrative layers are further described below with respect to FIG. 2. The tracking label 100 may be of any size or shape. It may be configured to be attached to or otherwise coupled to or placed onto or into any type of item, including for example a container that contains other items.

The top layer 101 may have any type of human or machine readable text, images, codes, or symbols. It may serve as a shipping label, as in the example shown in FIG. 1, or as any other type of marking or identifier. The label may contain codes such as a QR code 111 and/or a barcode 112. In one or more embodiments, one or more of these codes may correspond to a unique identifier of the tracking label. The label may contain any symbols that indicate the functionality of the electronic components integrated into the label, such as symbol 110 that indicates that this label provides automatic location tracking.

Layer (or layers) 102 may contain components that provide tracking and monitoring functionality. FIG. 1 shows a block diagram of illustrative components; embodiments may include any or all of these components, as well as additional components not shown in FIG. 1. The components shown in FIG. 1 may be implemented as discrete elements or some or all of them may be integrated into one or more integrated circuits. The tracking label may include a controller 121, which may be any type or type of processor, including for example, without limitation, a microcontroller, a microprocessor, a CPU, a GPU, or an ASIC. It may have one or more communications interfaces 124 coupled to the controller, which may include wireless or wired interfaces. It may have a memory 122 coupled to the controller, which may include either or both of volatile and nonvolatile memory. The memory 122 may contain a stored identifier 123 of the tracking label. This identifier 123 may be unique across a set of tracking labels. In one or more embodiments the identifier may be for example a MAC address, an IP address, or a GUID. The identifier 123 may correspond to a readable code on the top layer of the label, such as QR code 111 or barcode 112. As described below, the centralized tracking label monitoring system may use the identifier 123 (and/or codes such as code 111) to index data collected about the tracking label.

Tracking label 100 may have a power source, such as a battery 125. One or more embodiments of the tracking label may use energy harvesting circuits 126, which may for example obtain electromagnetic energy from a communications interface 124, or may harvest thermal, solar, or motion energy. Energy harvesting component 126 may directly power the other components, or it may be used to charge battery 125.

The tracking label may include one or more sensors 131. Sensors may monitor any state of the label, of the item to which the label is attached, or the of environment surrounding this item. Sensors may include for example, without limitation: a location sensor 132, such as a GPS receiver; a motion sensor such as an accelerometer or gyroscope; a temperature sensor; a light sensor; a humidity sensor; a pressure sensor; a shock sensor, which may include for example a piezoelectric element; a sensor such as printed resistive material that detects bending or peeling; and a sensor that detects when an item or container is opened or a seal is broken, such as a resistance sensor or a continuity sensor. These sensors are illustrative; one or more embodiments may contain any type or types of sensors. Sensors may collect sensor data at any interval, or when triggered by some event. Sensor data may be transferred for example to controller 121, and this data may be stored in memory 122 or transmitted via communications interface 124.

The tracking label may include one or more indicators 133. Indicators may for example indicate whether a sensor has detected an "alert" condition (which may be configurable, as described below). For example, a tracking label with a temperature sensor may be placed on an item that should be kept within a temperature range, and a temperature alert indicator may be illuminated if the temperature sensor detects a temperature outside this range. Indicators may for example be LEDs, such as OLEDs, that are illuminated under specific conditions. In one or more embodiments the indicators 133 may include a display, and alerts or status messages or symbols may be shown on the display.

Illustrative tracking label 100 has a tear-off or clip-off tab 113 at the bottom of the label. A user of the label may remove this tab to activate the electronic components of the tracking label. This feature supports use cases where tracking labels are manufactured and stored in advance of their use. After manufacturing and testing, the tracking labels may be placed into a hibernation state that consumes very little power. When a label is to be used, tab 113 is removed, which switches the label into an active state. Embodiments of the invention may use various mechanisms for activation, including but not limited to a tear off tab 113. These activation mechanisms may modify an activation input 127 into the controller when the user or an activation device performs some activation action to activate the associated tracking label. When the controller 121 receives the change in the activation input, it may switch the label's electronics from the hibernation state to the active state. Illustrative activation mechanisms are described below with respect to FIG. 5.

Label 100 may be flexible so that it can be placed onto a curved or bent surface. The electronic components in layer(s) 102 may be constructed using flexible circuit techniques, which may for example use very thin components and traces, and substrates made of flexible materials.

Figure 2:
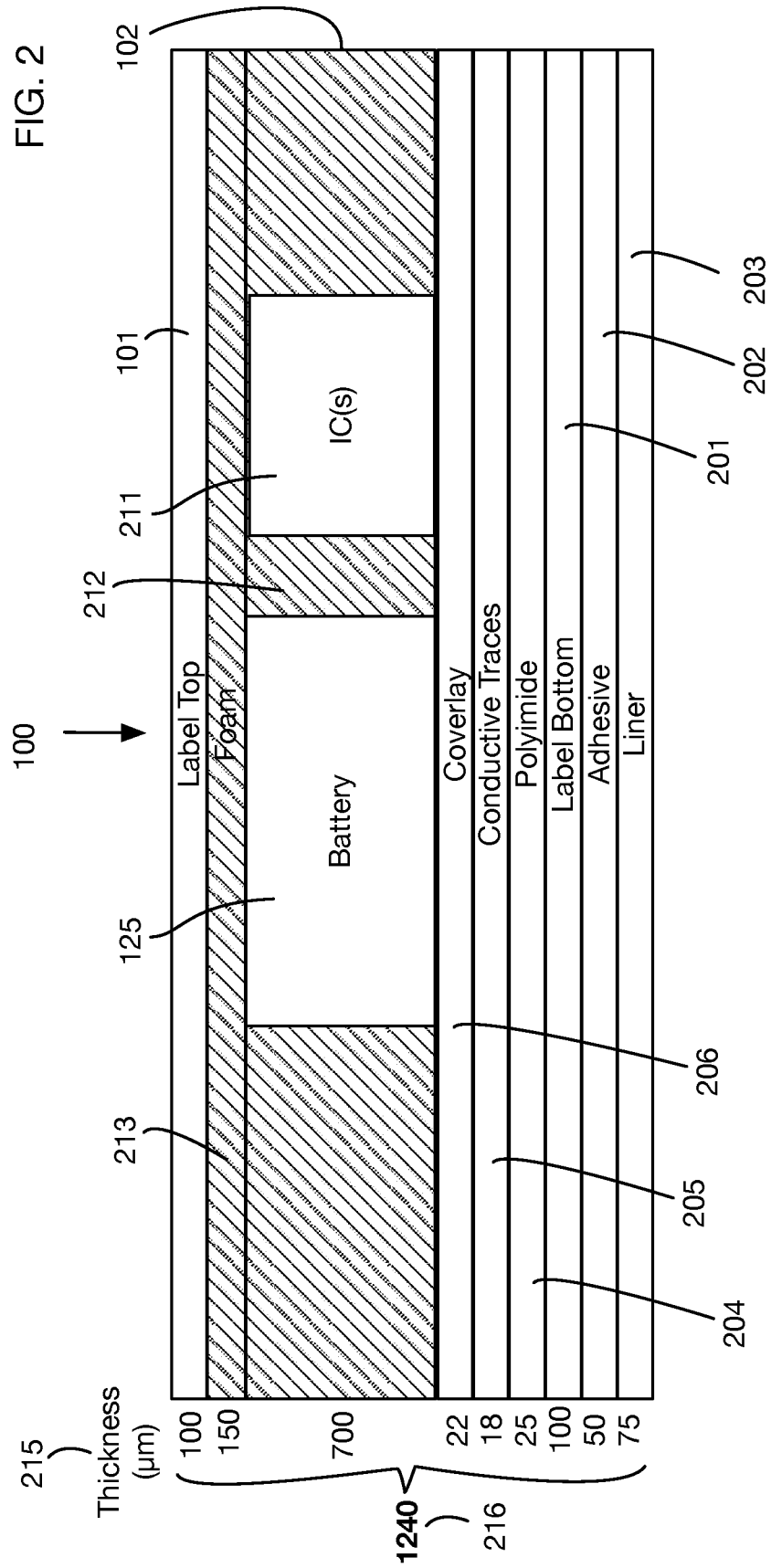
FIG. 2 shows a side cross-section view of the illustrative tracking label of FIG. 1, showing the layers that contain the readable label and the electronics.

FIG. 2 shows a side cross-section view of illustrative layers in one or more embodiments of tracking label 100. Top layer 101 may contain printed text or symbols, as shown for example in FIG. 1; this layer may be a polyester film made of polyethylene terephthalate (PET), for example. The bottom layers of the tracking label may include a label bottom layer 201, which may be made also of PET for example, and an adhesive layer 202 below the layer bottom; the adhesive may be covered by a removable liner 203. Above the label bottom may be a polyimide layer 204 covered by conductive traces 205 (made for example of copper), covered with a coverlay layer 206 with holes for soldering or otherwise connecting electronic components to the conductive traces.

The electronic components 102 may be above the coverlay layer 206; these components may be soldered to conductive traces in layer 205 for interconnections, or attached to conductive traces with a conductive adhesive or other conductive material. In an illustrative embodiment, battery 125 may be a separate component, and other elements such as the MCU, sensors, memory, etc. may be combined into an integrated circuit 211, or into multiple integrated circuits. One or more layers of acrylic, epoxy, or similar materials may be placed around the integrated circuit(s) 211 to protect the integrated circuit(s) and the solder joints or other connections from the circuits to the conductive traces. The components may be separated by foam 212 or air gaps, for example. A foam layer 213 may cover the electronic components layer 102.

FIG. 2 shows illustrative layer thicknesses 215, in micrometers, for each of the layers 101, 213, 102, 206, 205, 204, 201, 202, and 203. The total thickness 216 of this illustrative embodiment is less than 1.5 millimeters. Because embodiments of the invention may have minimal thickness, they may be placed on very small items and on items with non-flat surfaces. They may also be placed inside containers without substantially reducing the volume of the containers.

Figure 3:
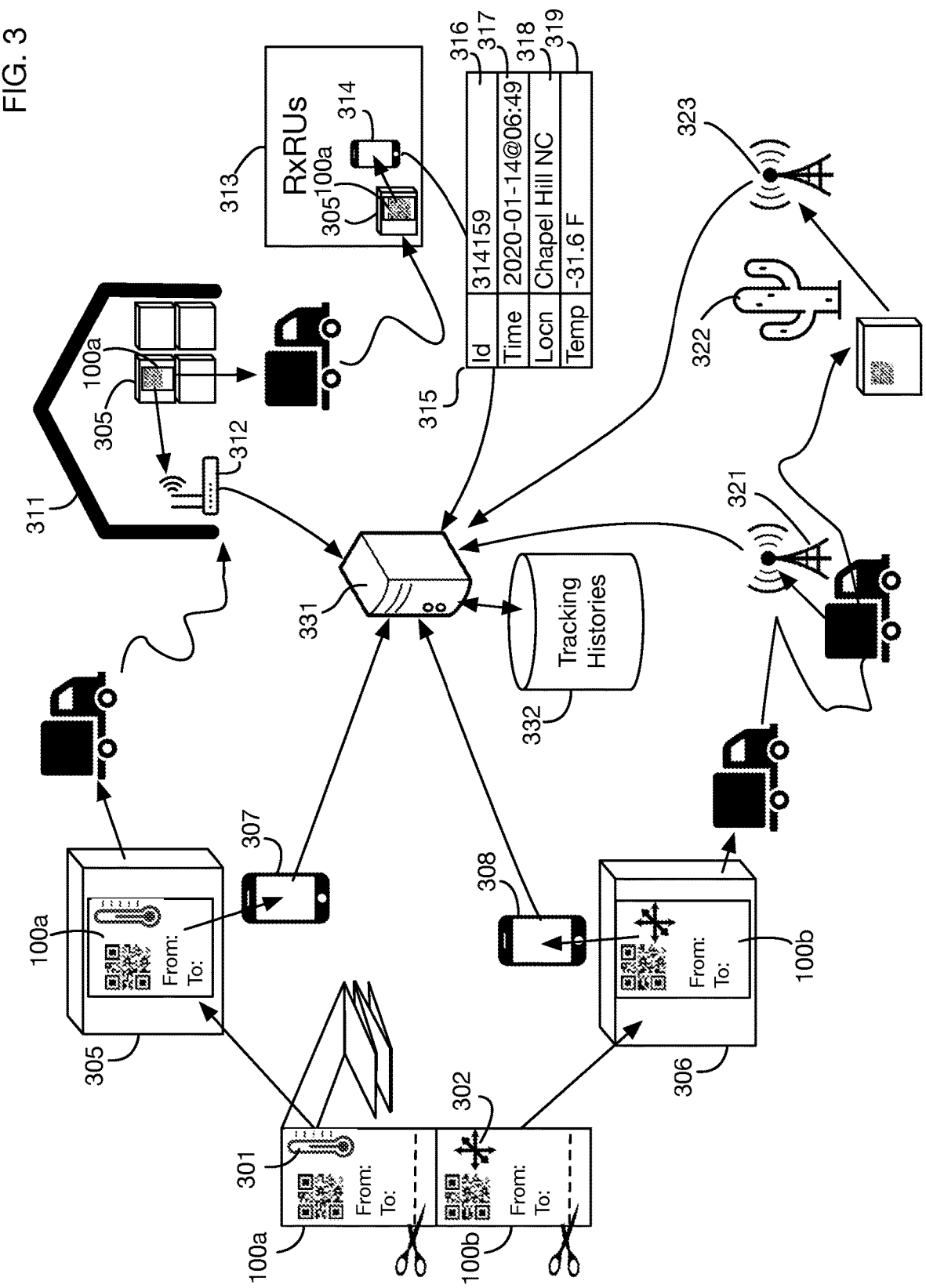
FIG. 3 shows an illustrative item tracking system that uses tracking labels such as the label of FIG. 1 and that receives updates on items' locations and sensor values.

In one or more embodiments of the invention, tracking labels such as illustrative label 100 or similar labels may be integrated into an item tracking system. FIG. 3 shows an illustrative scenario for an item tracking system, which includes tracking labels 100*a* and 100*b*, a server 331, and a database 332 that may store data collected from the tracking labels. Only two tracking labels are shown for ease of illustration; one or more embodiments may support simultaneous tracking of thousands or millions of tracking labels. Server 331 may be any type of processor or a network of multiple processors. Similarly database 332 may be include type of storage device or devices, and any type or types of data organization and access software. Database 332 may be for example, without limitation, one or more SQL databases, non-SQL databases, files, tables, spreadsheets, associative memories, or any other data structures. Server 331 may be connected directly or indirectly to tracking labels via any types of network connections, possibly via any intermediate devices, as described below.

Illustrative tracking labels 100*a* and 100*b* may be configured for different applications; for example, label 100*a* may be configured to track an item that is temperature sensitive (such as a pharmaceutical), and label 100*b* may be configured to track an item that is shock sensitive (such as a fragile item). Tracking label 100*a* may therefore include a temperature sensor 301, and tracking label 100*b* may include a shock sensor (such as an accelerometer) 302. In the scenario shown in FIG. 2, label 100*a* is attached to an item 305, which may be a container containing a temperature-sensitive product, and label 100*b* is attached to an item 306, which may be a container containing a shock-sensitive product. The activation tabs may be removed from the labels before they are affixed, putting each label into an active tracking state.

Continuing with this scenario, prior to shipping items 305 and 306 with the attached and activated tracking labels 100*a* and 100*b*, respectively, the shipper uses devices 307 and 308 (which may be the same device) to obtain initial information from the tracking labels. For example, these devices may connect to each tracking label using a Bluetooth interface. Devices 307 and 308 may be any types of devices, including but not limited to mobile devices such as smartphones. The state of each label may be collected by the devices and then may be transmitted to server 331, for example over an internet connection. The label state may include the label's unique identifier, location, and sensor values of any sensors incorporated into the label. The server 331 may generate a tracking history for each label and store this history in database 332. The tracking history for a tracking label may include the unique id of the label, and a list of state updates that may include for example a timestamp, a location where the label is located at that timestamp, and sensor readings from the label at that timestamp.

Item 305 is then shipped to a warehouse 311, where another update on the state of the attached label 100*a* is obtained and transmitted to server 331. In this case a Wi-Fi access point 312 in the warehouse connects to a Wi-Fi interface in the tracking label, and the label transmits location and sensor data via this access point 312 to the server. In this example, tracking label 100*a* includes two different communications interfaces: a Bluetooth interface and a Wi-Fi interface. In one or more embodiments, a tracking label may have any type or types of communications interfaces, as described below with respect to FIG. 7. Updates on the tracking label location and sensor readings may be transmitted to the server using any of these interfaces. Depending on what interfaces are available, the tracking label may out of range of compatible networks for periods of time. For example, label 100*a* may be out of range while it is being transported to warehouse 311. In one or more embodiments, the label may be configured to collect sensor data at certain intervals, or upon certain events, and to store the collected data in the label's memory, regardless of whether a network connection is currently available. At the next connection, for example when label 100*a* is in range of access point 312, the label may transmit updates including any stored sensor data. This allows users of the tracking system to monitor the history and trend of the tracked item's state, even when the users may not receive notifications of new data until the next network connection and state update message.

Continuing with the scenario shown in FIG. 3, item 305 is then shipped from warehouse 311 to a retail outlet 313. A mobile device 314 in this outlet connects to the Bluetooth interface of tracking label 100a to obtain another update. FIG. 3 shows contents of an illustrative tracking label update message 315 that may be sent to server 331. This message contains the unique identifier 316 of the tracking label, the time (including date) 317 of the update, the location 318 of the tracking label, and sensor reading 319 from the tracking label (which in this case measures temperature). The server receives this data and updates the tracking history for the associated tracking label.

Item 306 is shipped directly to its final destination 322. Tracking label 100b attached to this item has a cellular network interface, so that update messages may be transmitted from the label to the server 331 whenever there is an available cellular network. For example, when the truck carrying item 306 passes within range of a cell tower 321, the label 100b may transmit an update message to the server with its current location and the recent sensor readings. Similarly when the item arrives at destination 322, if a cell tower 323 is in range, the tracking label can send another status update to server 331, indicating that it is at its final destination.

Figure 4:
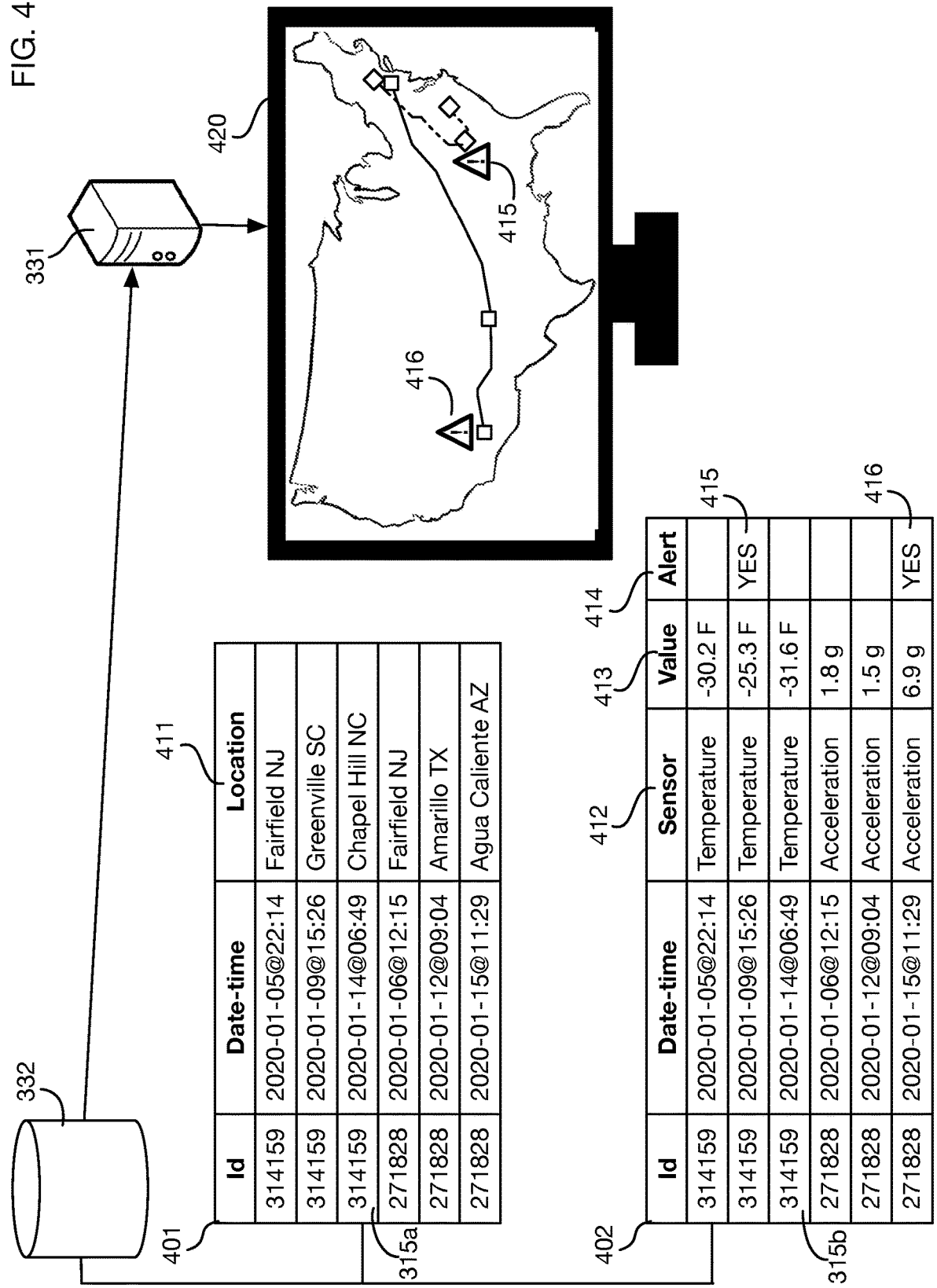
FIG. 4 shows illustrative data collected by the item tracking system of FIG. 3.

FIG. 4 shows illustrative tracking history data that may be stored in database 332 for tracking labels 100a and 100b in the scenario shown in FIG. 3. In this illustrative database, update information is stored in two tables 401 and 402; table 401 contains location information and table 402 contains sensor reading information. Table rows may be indexed by the unique identifier of the tracking label. This table organization is illustrative; one or more embodiments may organize tracking history data in any desired manner. For example, row 315a in table 401 and row 315b in table 402 are derived from tracking label update message 315 transmitted when item 305 arrives at location 313. Location field 411 in table 401 is shown as a city; one or more embodiments may track locations with any desired granularity, including for example, without limitation, at the level of a state, county, city, zip code, or latitude/longitude. Location may be tracked with any degree of accuracy, which may depend for example on the location sensing technology used for the tracking label.

Sensor data table 402 includes an identifier 412 of the specific sensor(s) in each tracking label, a value 413 read from that sensor at the associated date/time, and an alert field 414. Each tracking label may be configured with sensor data ranges or rules that indicate when alerts should be generated. (Server 331 may also analyze data in database 332 to generate other alerts or take any desired actions.) In one or more embodiments, an alert may also trigger a change in an indicator on the sensor, such as an indicator light or a display. Any device that connects to a tracking label may process any received alerts and may for example generate messages or take other actions when alerts occur. In the scenario shown in FIGS. 3 and 4, alert 415 occurs when the temperature of the item in warehouse 311 exceeds the desired temperature range of −30 F or below; alert 416 occurs when the package is delivered and is dropped with excessive shock to the contents.

Server 331 or any other systems may access database 332 and perform any analyses on the data, and may take any actions based on these analyses. In FIG. 4, server 331 presents a map display 420 to users that shows the routes followed by items 305 and 306, and shows where alerts have occurred. Server 331 may for example initiate corrective actions based on the alerts, such as sending replacement items or informing the receivers of the items of potential issues. Analyses may also indicate trends or patterns, such as carriers or locations that tend to generate excessive alerts, or that result in delivery delays. Alerts may also be generated if locations 411 are unexpected, or if an item arrives at a location at a time that is not expected.

Figure 5:
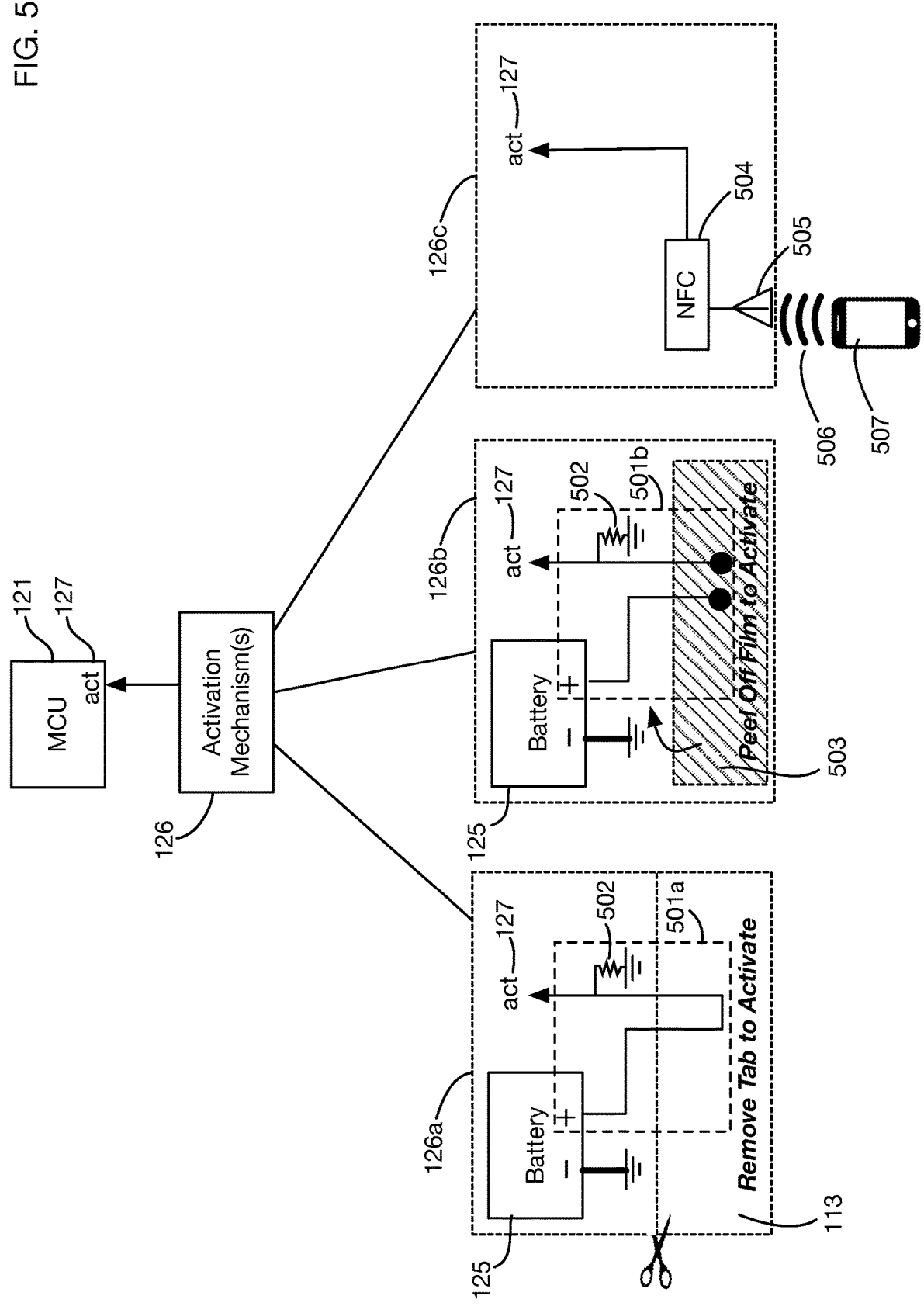
FIG. 5 shows three illustrative label activation mechanisms that may be used in one or more embodiments of the invention.

FIG. 5 shows three illustrative activation mechanisms 126 that may be used in one or more embodiments of the tracking labels. Each of these mechanisms may for example generate a change in an activation input 127, which may be input for example into controller 121. Controller 121 (or other components) may detect a change in this input and activate the label electronic components accordingly. Activation mechanism 126a, which is also shown in FIG. 1, includes a tab or section 113 of the tracking label that is removed to activate the label. Circuit 501a contains a conductive path from the positive terminal of battery 125 to the activation input 127, with a portion of this path passing through the tab 113. When the tab is attached to the label, input 127 is positive (high). When the tab is removed, this path is broken and input 127 is pulled to ground through resistor 502; controller 121 detects this voltage change and activates the tracking label.

Activation mechanism 126b is similar to mechanism 126a, but instead of removing a tab to activate the label, the tracking label has a sheet of conductive film 503 that is peeled off to activate the label. Circuit 501b has a conductive path from the battery to the activation input 127 that passes through the sheet of conductive film; this path is broken when the film is removed.

Activation mechanism 126c activates the tracking label when an external activation device 507 transmits electromagnetic energy 506 to a receiving antenna 505 in the tracking label. For example, an NFC (near-field communication) signal may be used to bootstrap the tracking label. A receiving circuit 504 may for example transform the received signals from the antenna into a voltage change on activation input 127 to activate the tracking label.

These activation mechanisms are illustrative; one or more embodiments may activate a tracking label based on any activation action, which may include physical modification to the label, or any manual inputs or signal inputs into the label.

Figure 6:
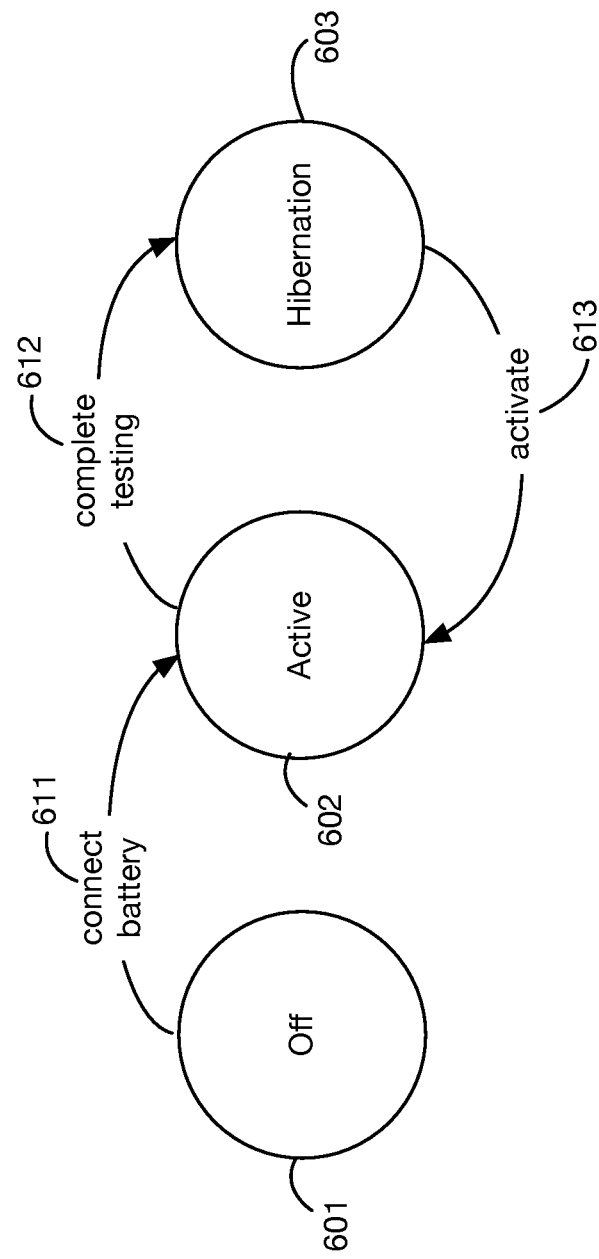
FIG. 6 shows a state transition diagram for testing and activation of a tracking label.

FIG. 6 shows an illustrative state transition diagram for the activation state of a tracking label. One issue addressed by one or more embodiments of the invention is that the tracking label circuitry may need to be tested after assembly, which requires the circuits to be active. However, after testing the circuitry may need to be placed into a low power consumption hibernation state to maintain the battery life until the tracking label is used.

Therefore, as shown in FIG. 6, a newly manufactured tracking label may transition immediately from an "off" state 601 (no power) to an "active" state 602 when the battery connected event 611 occurs. After testing complete event 612 occurs, the label may transition to a "hibernation" state 603 that consumes very little power. Testing completion may occur automatically or in response to a signal from the testing environment. The tracking label circuitry may then await the activate signal 613 to transition back to the active state 602 for use.

Figure 7:
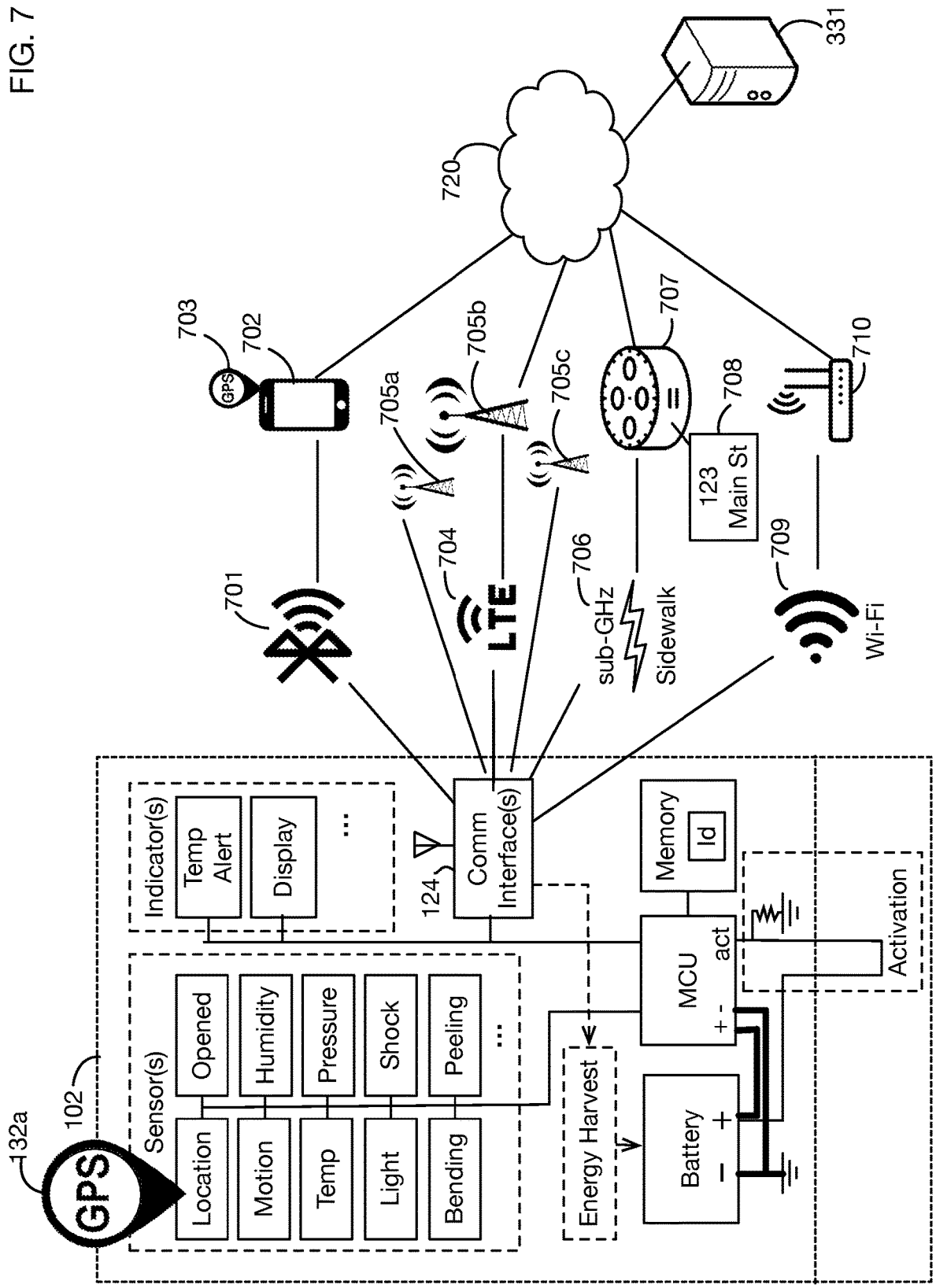
FIG. 7 shows illustrative communications interfaces that may be used in one or more embodiments of a tracking label, and methods for determining the location of a tracking label.

FIG. 7 shows illustrative tracking label communications interfaces 124 that may be used in one or more embodiments of the invention. Some tracking labels may have multiple communications interfaces. The selection of a communications interface or interfaces may depend for example on application connectivity requirements (for example, whether frequent updates of label state are needed even when the item to which the label is attached is in transit), and on desired tradeoffs between cost, connectivity, and power consumption. The choice of communications interfaces may also be related to the methods used to determine the location of a tracking label.

Some communications interfaces may be limited in range to a local area, such as a building or room. Such an interface may therefore be usable only when the tracking label is in the vicinity of a device or access point that is compatible with that interface. A Bluetooth interface 701 for example may communicate with a local device 702, such as a mobile phone. In one or more embodiments, Bluetooth interface 701 may be a Bluetooth Low Energy (BLE) interface. A Wi-Fi interface 709 may communicate with a local Wi-Fi access point or router 710. The local devices, such as mobile device 702 or Wi-Fi access point 710, may then connect to server 331 via network (or networks) 720. Network 720 may be public (such as the Internet) or private (including VPN links through public networks).

Communications interfaces 124 may also include Amazon Sidewalk interfaces 706. Amazon Sidewalk uses sub-Gigahertz frequency transmission and may connect for example to compatible devices 707, such as Amazon Echo™ devices. These devices may be connected to server 331 via Internet connections or via other networks.

Communications interfaces 124 may also include longer-range network interfaces, such as cellular network interfaces 704. Tracking labels with cellular network interfaces may be able to transmit or receive information from any cell towers or cellular antennas within range. This range may be many kilometers in some areas. The cellular network may then provide connectivity to server 331. One or more embodiments of the invention may use any cellular network technology or technologies, such as for example, without limitation, CDMA, GSM, or LTE.

FIG. 7 also illustrates methods that may be used in one or more embodiments to determine the location of a tracking label. A tracking label may contain a location sensor such as a GPS receiver 132a or similar locating component. If such a location sensor is present, the controller may query the sensor to obtain the label's location. If there is no such sensor, or if the sensor is unavailable (for example if GPS receiver 132a cannot access a GPS signal), other methods may be used to determine the label's location. For example, a device in the vicinity of the tracking label, such as mobile device 702, may have a GPS receiver 703 or other mechanism to determine the device's location. When the tracking label is connected to this local device, the local device may obtain sensor data from the tracking label, and may add its own location to this data as the location of the label for the update message that is transmitted to server 331. Because the local device is very near the tracking label, the device's location is almost identical to that of the label. Another scenario is illustrated with local device 707, where the device is configured with an address 708; this address may be used as the label's location when the label is connected via network interface 706 to this device.

For tracking labels with cellular network interfaces 704, location may be determined using triangulation from different cell towers, such as towers 705a, 705b, and 705c. The signal strength from each tower and the known location of the towers may be used to determine the location. This locating method may be used as a backup if other methods are unavailable, for example if a GPS 132a is not responding or if no local devices such as 702 or 707 are within range. Triangulation may be used from any type of signal sources, including but not limited to cellular signals.

Figure 8:
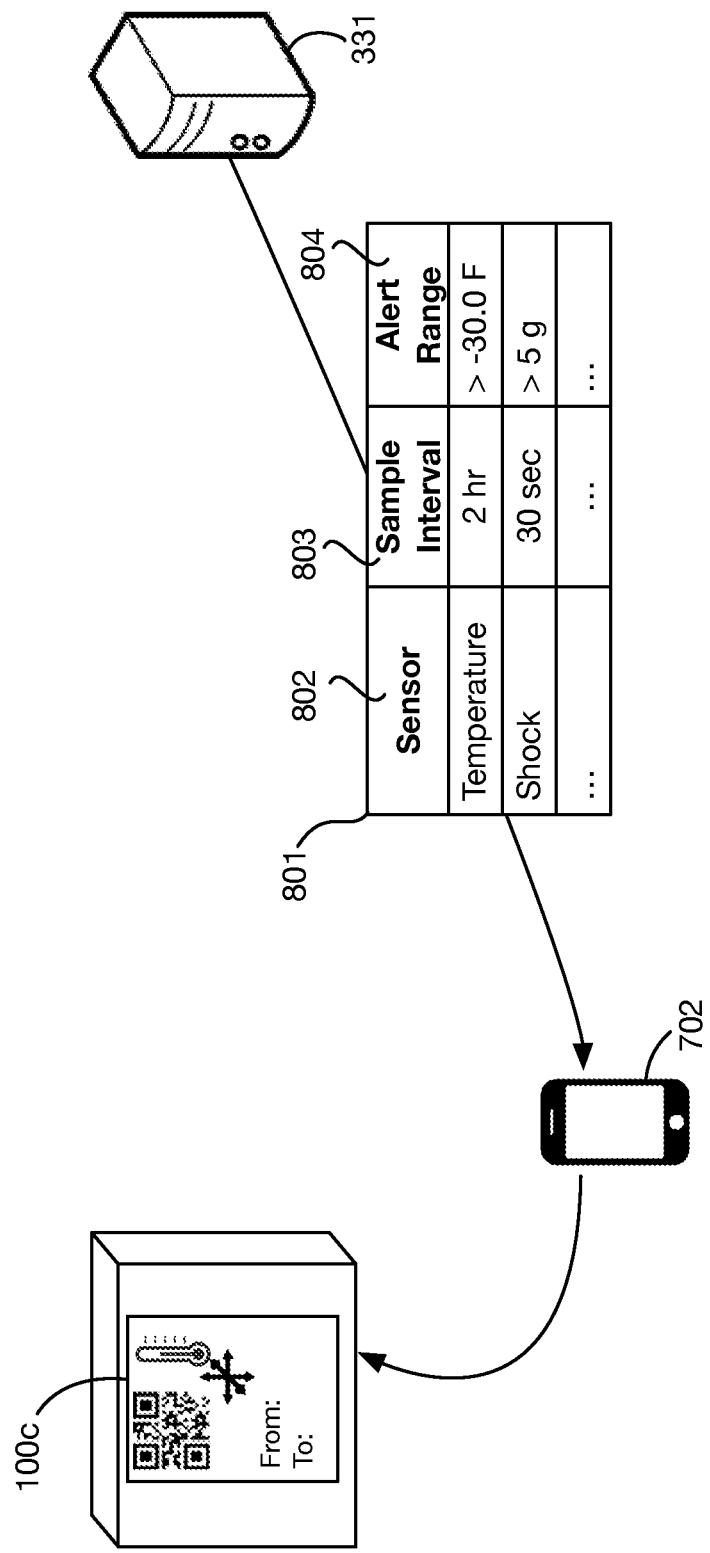
FIG. 8 shows an illustrative settings update message that may be sent to a tracking label.

In one or more embodiments of the invention, tracking labels may have configurable rules that may control data collection or other parameters. For example, these rules or settings may specify how often sensor data is collected and what actions to take based on observed sensor values. FIG. 8 shows an illustrative example of modifying data collection rules for a tracking label 100c with both a temperature sensor and a shock sensor. Server 331 may transmit a message 801 to the tracking label, possibly via another device such as mobile device 702, to set or update the label's data collection rules. Message 801 may contain for example a sample interval 803 for one or more sensors 802, which controls how frequently each sensor will be polled. (This interval may differ for different sensors.) Sensor sampling intervals need not be constant; in one or more embodiments the sensor configuration may contain complex rules that control when data is collected, which may vary over time or vary based on previous readings or other events. Message 801 may also contain ranges 804 for sensor data that trigger a corresponding alert. Message 801 may also contain actions to be performed when certain alerts occur, such as illuminating an indicator, displaying a message, transmitting a message, or modifying the tracking label behavior.

FIG. 9 shows an illustrative scenario for a pharmaceutical supply chain application of an embodiment of the invention. This embodiment uses tracking labels to track a bottle of pills from the supplier to the end user, including tracking of consumption and management of refills. In the first step a tracking label 100d is activated and placed on the bottom surface of an empty pill bottle 901. This label 100d includes a weight sensor 902. This weight sensor will monitor the number of pills in the bottle. Next another tracking label 100e is activated and placed on the outside of the bottle. This label 100e includes a temperature sensor 903 and a light sensor 904. The temperature sensor is used because the medication that will be placed in the bottle should not be exposed to high temperatures. The bottle is then filled with pills 909 and closed, resulting in a filled and labeled bottle 910 ready to ship. This bottle 910 is placed into a container 911 with other items, and is shipped to warehouse 923. The truck carrying the container 911 passes through a very hot area, and the temperature sensor 903 detects a temperature above the desired range. A temperature alert 922 is therefore generated, and the tracking label 100e connects to a cell tower 921 and transmits this alert to server 331. The manufacturer or distributor may review this alert to determine whether the bottle should be discarded; in this scenario, the temperature alert is deemed not serious.

When container 911 arrives at warehouse 923, Wi-Fi router 924 connects to tracking label 100e. When container 911 is opened, the light sensor 904 in label 100e detects the opening and sends an alert 925 to server 331 via the Wi-Fi router 924. A person or an automated process may review this alert and determine that the opening of the container is expected since the location of the tracking label is warehouse 923; if the location were different, it might be classified instead as tampering with or stealing the contents of the container.

Bottle 910 is then shipped to its final destination, house 926. When the bottle arrives at the house (even if it is outside in a mailbox or in front of the house), tracking label 100e connects to an Amazon Sidewalk enabled device (such as Echo™ 927) and transmits an update 928 to server 331 with the label's location. A manual or automated process may therefore determine that the bottle has arrived at its intended destination. (If the location is different from the intended destination, an alert may be generated that the bottle has been stolen or misdelivered.) Tracking label 100d at the bottom of the bottle may also connect to device 927 and report the weight of the bottle to confirm that it is still full. As the user consumes pills 909 from the bottle, the weight detected by the weight sensor in label 100d decreases; periodic update messages to the server may be analyzed to determine how many pills the user has consumed at any point in time. This information may be used to monitor the user's compliance with the pill dosage schedule. Reminders may be transmitted to a user device 930 if the user misses a dose, for example. When the number of pills remaining in the bottle falls below a threshold, a weight alert 929 may be sent to server 331, and the server may send a message to the user device 930 suggesting ordering a refill, or it may automatically generate a refill order.

While the invention herein disclosed has been described by means of specific embodiments and applications thereof, numerous modifications and variations could be made thereto by those skilled in the art without departing from the scope of the invention set forth in the claims.

What is claimed is:

1. An item tracking system with electronic tracking labels containing sensors, comprising:
    a multiplicity of tracking labels, each tracking label of said multiplicity of tracking labels comprising
        a label configured to be attached to an item;
        a flexible electronic circuit attached to or integrated into said label, said flexible electronic circuit comprising
            a controller;
            a power source;
            a wireless communications interface;
            one or more sensors;
            a unique identifier; and
            an activation mechanism configured to modify an activation input when a user or an activation device performs an activation action;
            wherein
                said flexible electronic circuit switches from a hibernation state to an active state when said activation mechanism modifies said activation input;
    a database comprising a tracking history associated with each tracking label of said multiplicity of tracking labels;
    a server coupled to said database, wherein said server is configured to
        receive one or more tracking label update messages associated with said each tracking label, wherein each tracking label update message of said one or more tracking label update messages comprises
            said unique identifier of said each tracking label;
            a time;
            a location of said each tracking label at said time; and
            one or more sensor values captured by at least one of said one or more sensors of said each tracking label; and,
        add contents of said each tracking label update message to said tracking history associated with said each tracking label.

2. The item tracking system of claim 1, wherein said each tracking label comprises a plurality of layers comprising
    a liner layer;
    an adhesive layer above said liner layer;
    a label bottom layer above said adhesive layer;
    a conductive traces layer above said label bottom layer;
    an electronic components layer above said conductive traces layer; and,
    a label top layer above said electronic components layer.

3. The item tracking system of claim 2, wherein
    a maximum thickness of said each tracking label is less than or equal to 1.5 millimeters.

4. The item tracking system of claim 1, wherein
    said activation mechanism comprises an electrical path coupling said power source to said activation input; and,
    said activation action breaks said electrical path, changing said activation input.

5. The item tracking system of claim 4, wherein
    said each tracking label comprises a portion of said each tracking label that said electrical path passes through; and,
    removal of said portion of said each tracking label breaks said electrical path.

6. The item tracking system of claim 5, wherein said portion of said each tracking label comprises one or both of
    a tab of said each tracking label configured to be torn off or cut off;
    a conductive sheet configured to be peeled off.

7. The item tracking system of claim 1, wherein
    said activation mechanism comprises an electrical path coupling a near-field communication receiver to said activation input; and,
    said activation action comprises transmission of electromagnetic energy to said near-field communication receiver.

8. The item tracking system of claim 1, wherein said power source comprises one or both of a battery; and,
    an energy harvesting circuit that receives power from an environment of said each tracking label.

9. The item tracking system of claim 1, wherein said one or more sensors comprise one or more of a temperature sensor;
    a humidity sensor;
    a light sensor;
    a motion sensor;
    a pressure sensor;
    a shock sensor;
    a sensor that measures peeling or bending;
    a sensor that detects opening of a container or breaking of a seal.

10. The item tracking system of claim 1, wherein said flexible electronic circuit further comprises one or more indicators.

11. The item tracking system of claim 10, wherein said one or more indicators comprise one or more of an LED;
    a display.

12. The item tracking system of claim 1, wherein said wireless communications interface comprises one or more of
    a Bluetooth interface;
    a Wi-Fi interface;
    a cellular network interface;
    a sub-Gigahertz wireless interface.

13. The item tracking system of claim 1, wherein
    said wireless communications interface comprises an interface to a cellular network; and,
    said location of said each tracking label is determined via triangulation via said cellular network.

14. The item tracking system of claim 1, wherein
said flexible electronic circuit associated with said each tracking label further comprises a GPS receiver; and,
said controller of said each tracking label is configured to obtain said location of said each tracking label from said GPS receiver.

15. The item tracking system of claim 14, wherein
said wireless communications interface comprises an interface to a cellular network; and,
when said controller of said each tracking label does not receive said location of said each tracking label from said GPS receiver, said controller determines said location of said each tracking label via triangulation via said cellular network.

16. The item tracking system of claim 1, wherein
said wireless communications interface of said each tracking label is configured to connect to a local device in a vicinity of said each tracking label at said time;
said local device is coupled to said server via a network connection; and,
said local device is configured to transmit said each tracking label update message to said server.

17. The item tracking system of claim 16, wherein
said location of said each tracking label at said time comprises a location of said local device.

18. The item tracking system of claim 1, wherein said server is further configured to transmit a settings update message to one or more of said multiplicity of tracking labels.

19. The item tracking system of claim 18, wherein said settings update message comprises one or more sensor data collection rules.

20. The item tracking system of claim 19, wherein said one or more sensor data collection rules comprise one or more of
an interval at which a sensor of said one or more sensors should collect data;
a range that triggers an alert said data from said sensor is within said range.

* * * * *